US008381217B1

(12) United States Patent
Wijayaratne et al.

(10) Patent No.: US 8,381,217 B1
(45) Date of Patent: Feb. 19, 2013

(54) SYSTEM AND METHOD FOR PREVENTING RESOURCE OVER-COMMITMENT DUE TO REMOTE MANAGEMENT IN A CLUSTERED NETWORK STORAGE SYSTEM

(75) Inventors: Ravi Wijayaratne, Sunnyvale, CA (US); Ashok Dwarakinath, Sunnyvale, CA (US); Varun Jobanputra, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 341 days.

(21) Appl. No.: 12/771,959

(22) Filed: Apr. 30, 2010

(51) Int. Cl.
*G06F 9/46* (2006.01)
*G06F 15/16* (2006.01)
(52) U.S. Cl. ........................................ 718/102; 709/223
(58) Field of Classification Search .................... 718/102
See application file for complete search history.

(56) References Cited

U.S. PATENT DOCUMENTS

| | | | | |
|---|---|---|---|---|
| 7,356,770 | B1 * | 4/2008 | Jackson | 715/736 |
| 7,490,225 | B2 * | 2/2009 | Favor et al. | 712/216 |
| 8,037,475 | B1 * | 10/2011 | Jackson | 718/104 |
| 8,175,863 | B1 * | 5/2012 | Ostermeyer et al. | 703/22 |
| 2006/0149576 | A1 * | 7/2006 | Ernest et al. | 705/1 |
| 2007/0255758 | A1 * | 11/2007 | Zheng et al. | 707/200 |
| 2009/0228892 | A1 * | 9/2009 | Di Luoffo et al. | 718/104 |
| 2011/0010457 | A1 * | 1/2011 | Tanttu et al. | 709/226 |

* cited by examiner

*Primary Examiner* — Andy Ho
*Assistant Examiner* — Abdou Seye
(74) *Attorney, Agent, or Firm* — Perkins Coie LLP

(57) ABSTRACT

A clustered network storage system includes a management module and a resource allocation mechanism configured to allow remote management of node resources from the management module while preventing resource over-commitment due to the remote management. Preventing resource over-commitment includes conditionally granting access to the resources of a node according to a credit based system. Preventing resource over-commitment further includes scheduling jobs that access the resources of the node according to a prioritization scheme.

7 Claims, 7 Drawing Sheets

SYSTEM AND METHOD FOR PREVENTING RESOURCE OVER-COMMITMENT DUE TO REMOTE MANAGEMENT IN A CLUSTERED NETWORK STORAGE SYSTEM

FIELD OF THE INVENTION

At least one embodiment of the present invention pertains to network storage systems, and more particularly, to performing remote management of resources of a node of a clustered network storage system while avoiding resource over-commitment due to remote resource allocation without the knowledge of resource availability.

BACKGROUND

A storage controller is a physical processing device that is used to store and retrieve data on behalf of one or more hosts. A network storage controller can be configured (e.g., by "hardwiring", software, firmware, or any combination thereof) to operate as a storage server that serves one or more clients on a network, to store and manage data in a set of mass storage devices, such as magnetic or optical storage-based disks, tapes, or flash memory. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® storage operating system.

As storage systems become larger, in order to accommodate the need for more capacity, several problems arise. Particularly, the efficient use of storage space becomes more difficult. An example of inefficient use of storage space is duplication of data. Deduplication operations eliminate the redundant data objects and instead reference just the original object. These operations provide a benefit in storage space efficiency. The result can be reduced cost in storage acquisition or longer intervals between storage capacity upgrades and more efficient management of data stored on the volumes. Deduplication and other storage efficiency functions can be performed by a storage controller.

A network storage system can have a simple architecture; for example, an individual storage server can provide one or more clients on a network with access to data stored in a mass storage subsystem. Recently, however, with storage capacity demands increasing rapidly in almost every business sector, there has been a trend towards the use of clustered network storage systems, to improve scalability.

In a clustered storage system, two or more storage server "nodes" are connected in a distributed architecture. The nodes are generally implemented by two or more storage controllers. Each storage server "node" is in fact a storage server, although it is implemented with a distributed architecture. For example, a storage server node can be designed to include a network module ("N-module") to provide network connectivity and a separate data module (e.g., "D-module") to provide data storage/access functionality, where the N-module and D-module communicate with each other over some type of physical interconnect. Two or more such storage server nodes are typically connected to form a storage "cluster", where each of the N-modules in the cluster can communicate with each of the D-modules in the cluster.

A clustered architecture allows convenient scaling through the addition of more N-modules and D-modules, all capable of communicating with each other. Further, a storage cluster may present a single system image of stored data to clients and administrators, such that the actual location of data can be made transparent to clients and administrators. An example of a storage controller that is designed for use in a clustered system such as this is a NetApp FAS-series Filer employing NetApp's Data ONTAP® GX storage operating system.

Efficient use of storage space can also be a concern in a clustered storage system. The problem can even be magnified due to the distributed architecture of a clustered storage system. Because of the distributed architecture, the storage a client accesses may not all be controlled by the same D-module. Further, a single D-module may control storage accessed by multiple clients and managed by administrators in multiple locations. These multiple administrators may simultaneously request storage efficiency operations to be performed by the D-module. Storage efficiency operations are operations performed by the D-module to improve the way storage space is used. Deduplication and compression operations are examples of storage efficiency operations. However, each D-module has a limited amount of processing resources to perform the requested storage efficiency operations. If too many storage efficiency operation requests are made simultaneously, the processing resources on the D-module become overloaded and system performance for all users will be degraded.

The problem then becomes how to provide remote administrators the ability to schedule the limited storage efficiency resources, while avoiding resource over-commitment caused by too many concurrent requests for the processors on a given D-module.

SUMMARY

The techniques introduced here enable remote allocation of node resources in a clustered processing system while avoiding resource over-commitment. As a result, the storage efficiency resources on any node of a clustered network storage system can be managed from any node in the system without causing degraded system performance due to resource over-commitment. Further, the techniques described herein enable priority and credit based resource scheduling to improve quality of service for clients. These techniques collectively allow convenient storage efficiency management in a clustered network storage system while preventing the undesired result of resource over-commitment.

As described in greater detail below, in accordance with certain embodiments, the preventing of resource over-commitment can be implemented by conditionally granting access to resources of a storage server node (hereinafter simply "node") in a clustered network storage system according to credits granted to the storage node, and prioritizing the allocations based on available credits of a storage node.

According to one embodiment, a system for preventing resource over-commitment on a node of a clustered network storage system includes a resource allocation mechanism configured to allow remote management of node resources. The resource allocation mechanism can include a job submission module, a job scheduler, and a job buffer (e.g., a queue, as henceforth assumed herein to facilitate description). The job submission module which can submit a job request for processing only when a credit is available can be implemented on the management module. The job scheduler can be implemented on a data module and schedules jobs according to a prioritization scheme in response to receiving a job request from the job submission module. The job queue can also be implemented on the data module and can be configured to queue jobs until the resources become available to process the job.

According to one embodiment, a clustered network storage system can include a plurality of storage nodes and a plurality of virtual servers. Each of the virtual servers includes a management module configured to access resources on the plurality of nodes. Resource over-commitment could arise if a plurality of virtual servers attempt to access resources of a single node at the same time. The clustered network storage system therefore can include a resource allocation mechanism configured to allow the plurality of virtual servers to access node resources while preventing such resource over-commitment.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

System Environment

Figure 1:
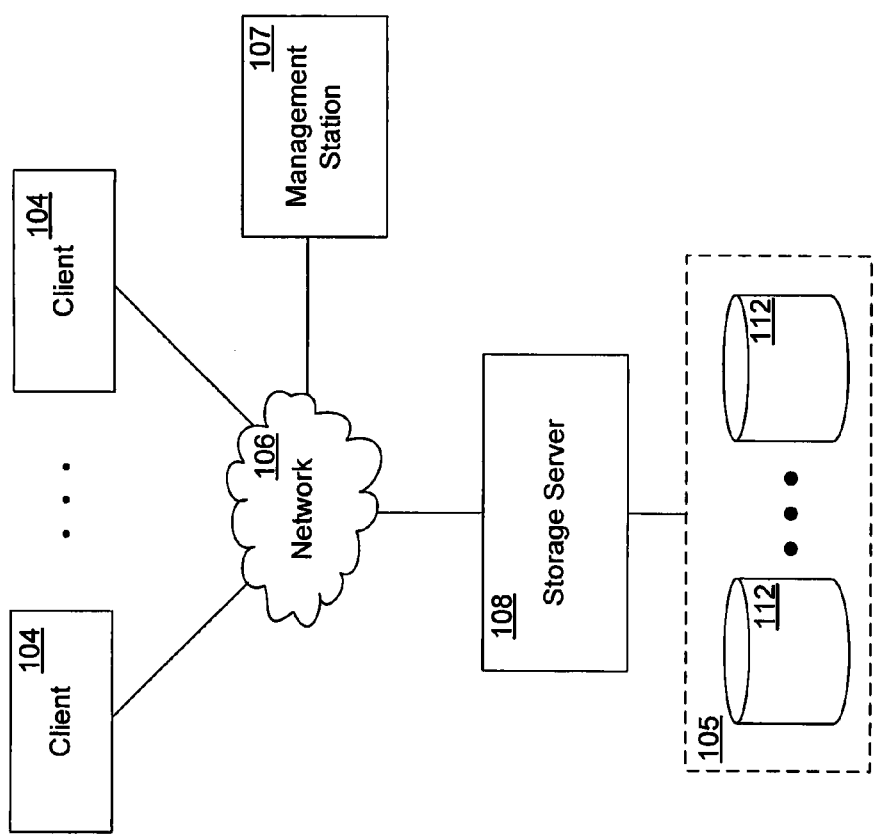
FIG. 1 illustrates a non-clustered network storage system.

FIG. 1 shows an example of a non-clustered network storage system, which includes a plurality of client systems 104, a storage server 108, and computer network 106 connecting the client systems 104 and the storage server 108. As shown in FIG. 1, a storage controller configured as a storage server 108 is coupled to a number of mass storage devices 112, such as disks, in a mass storage subsystem 105. Alternatively, some or all of the mass storage devices 112 can be other types of storage, such as flash memory, solid-state drives (SSDs), tape storage, etc.

The storage server 108 can be, for example, one of the FAS-series of storage server products available from NetApp, Inc. The client systems 104 are connected to the storage server 108 via the computer network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/or or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device (s). The storage server 108 can communicate with the client systems 104 according to well-known protocols, such as the Network File System (NFS) protocol or the Common Internet File System (CIFS) protocol, to make data stored on the disks 112 available to users and/or application programs. The storage server 108 can present or export data stored on the disks 112 as volumes and/or qtrees, to each of the client systems 104. Various functions and configuration settings of the storage server 108 can be controlled by a user, e.g., a storage administrator, from a management station 107 coupled to the network 106.

The storage server 108 can include a storage efficiency framework to manage the storage on the disks 112. One problem in particular is duplicate data. An average UNIX or Windows disk volume contains thousands or even millions of duplicate data objects. As data is created, distributed, backed up, and archived, duplicate data objects are stored unabated across all storage tiers. The end result is inefficient utilization of data storage resources. Deduplication operations eliminate the redundant data objects and instead reference just the original object. This storage efficiency framework can include a storage efficiency engine (not shown) to perform, for example, deduplication and compression operations to more efficiently use storage space on the disks.

Figure 2:
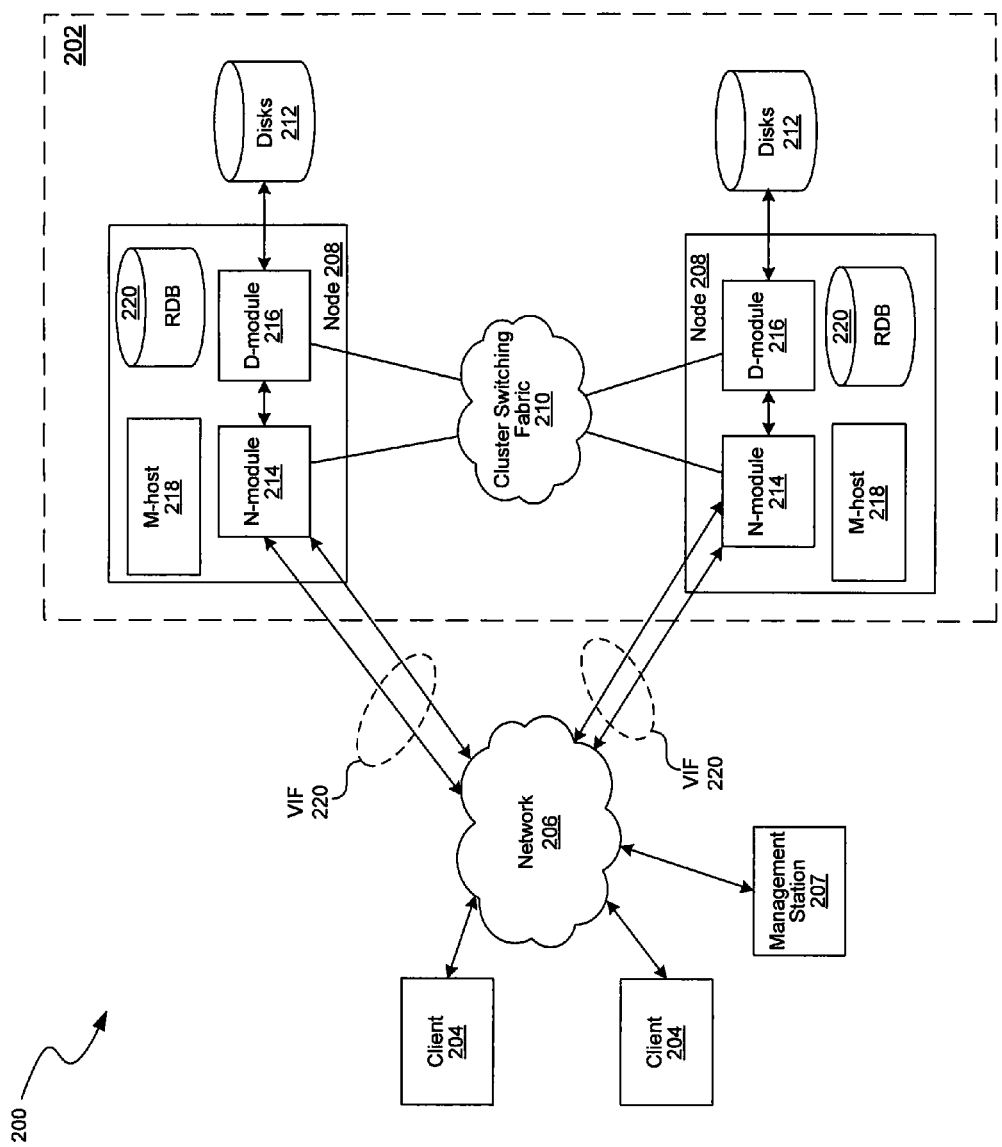
FIG. 2 illustrates a clustered network storage system.

FIG. 2 shows an example of a clustered network storage system. The system 200 includes a plurality of client systems 204, a clustered storage server system 202 ("cluster"), and a computer network 206 connecting the client systems 204 and the clustered storage server system 202. As shown in FIG. 2, the clustered storage server system 202 includes a plurality of storage server nodes (or simply "nodes") 208, a cluster switching fabric 210, and a plurality of mass storage devices 212. To facilitate description, in this example the mass storage devices are assumed to be disks. Alternatively, some or all of the mass storage devices 212 can be other types of storage, such as flash memory, SSDs, tape storage, etc.

Each node 208 essentially provides similar functionality to that of a storage server 108 in FIG. 1. However, unlike the storage servers 108 in FIG. 1, the nodes 208 are not operated and managed as distinct independent entities. Rather, they are operated and managed collectively as a single entity, i.e., a cluster 202. The cluster presents to users and administrators a single system image of all data stored by the cluster, regardless of where any particular data resides within the cluster.

Each of the nodes 208 is configured to include several modules, including an N-module 214, a D-module 216, and an M-host 218 (each of which can be implemented by using a separate software module) and an instance of a replicated database (RDB) 220. RDB 220 can be implemented as a number of individual databases, each of which has an instance located in each of the nodes 208. The N-modules 214 include functionality that enables their respective nodes 208 to connect to one or more of the client systems 204 over the network 206, while the D-modules 216 provide access to the data stored on their respective disks 212. The M-hosts 218 provide management functions for the clustered storage server system 202, including user interface functionality to enable an administrator to manage and control the cluster. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208 and includes a volume location database (VLDB). The VLDB indicates the location within the cluster of each volume (of data) in the cluster (i.e., the owning D-module 216 for each volume) and is used by the N-modules 214 to identify the appropriate D-module 216 for any given volume to which access is requested. Each volume in the system is represented by a data set identifier (DSID) and a master data set identifier (MSID), each of which is stored in two places: on disk in the volume itself and in the VLDB. The DSID is a system internal identifier of a volume. The MSID is an external identifier for a volume, used in file handles (e.g., NFS) and the like. The VLDB stores the identity and mapping (MSIDs-to-DSIDs) of all volumes in the system.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Various functions and configuration settings of the cluster 202 can be controlled by a user, e.g., a storage administrator, from a management station 207 coupled to the network 206. A plurality of virtual interfaces (VIFs) 222 allow the disks 212 associated with the nodes 208 to be presented to the client systems 204 as a single shared storage pool. FIG. 2 depicts only the VIFs at the interfaces to the N-modules 214 for clarity of illustration.

Figure 3:
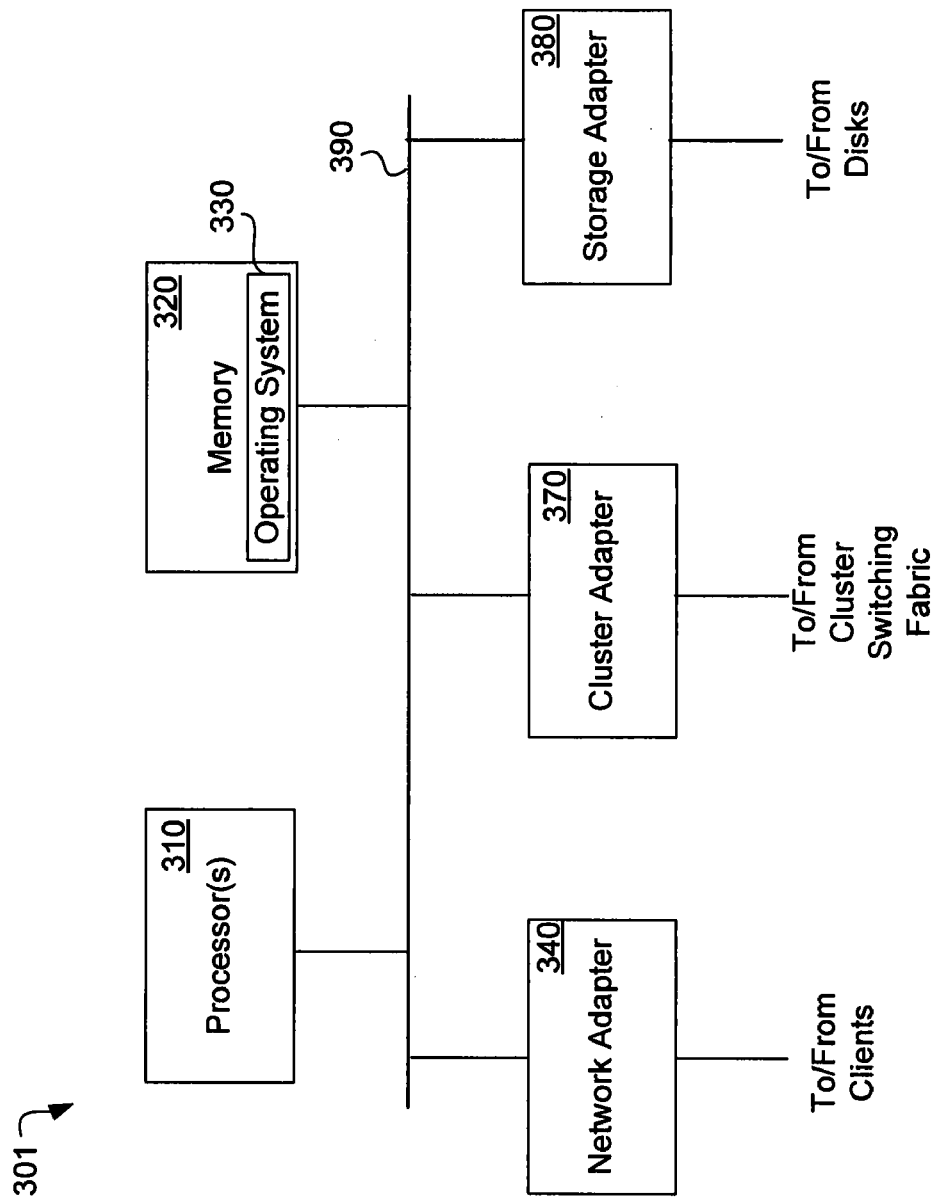
FIG. 3 is a high-level block diagram showing an example of the hardware architecture of a storage controller.

FIG. 3 is a diagram illustrating an example of a storage controller that can implement one or more storage servers 108, or one or more storage server nodes 208. In an exemplary embodiment, the storage controller 301 includes a processor subsystem 310 that includes one or more processors. The storage controller 301 further includes a memory 320, a network adapter 340, a cluster access adapter 370 and a storage adapter 380, all interconnected by an interconnect 390. The cluster access adapter 370 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, called a storage manager, to logically organize the information as a hierarchical structure of named directories, files, and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors 310 and adapters 340, 370, 380 for storing software program code and data associated with the present invention. The processor 310 and adapters may, in turn, comprise processing elements and/or logic circuitry configured to execute the software code and manipulate the data structures. The storage operating system 330, portions of which are typically resident in memory and executed by the processing elements, functionally organizes the storage controller 301 by (among other things) invoking storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes a plurality of ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that include a collection of physical storage disks cooperating to define an overall logical arrangement of volume block number (VBN) space on the volume(s). The disks 212 can be organized as a RAID group. One or more RAID groups together form an aggregate. An aggregate can contain one or more volumes/file systems.

The storage operating system 330 facilitates clients' access to data stored on the disks 212. In certain embodiments, the storage operating system 330 implements a write-anywhere file system that cooperates with one or more virtualization modules to "virtualize" the storage space provided by disks 212. In certain embodiments, a storage manager 460 (FIG. 4) logically organizes the information as a hierarchical structure of named directories and files on the disks 212. Each "on-disk" file may be implemented as set of disk blocks configured to store information, such as data, whereas the directory may be implemented as a specially formatted file in which names and links to other files and directories are stored. The virtualization module(s) allow the storage manager 460 to further logically organize information as a hierarchical structure of blocks on the disks that are exported as named logical unit numbers (LUNs).

Figure 4:
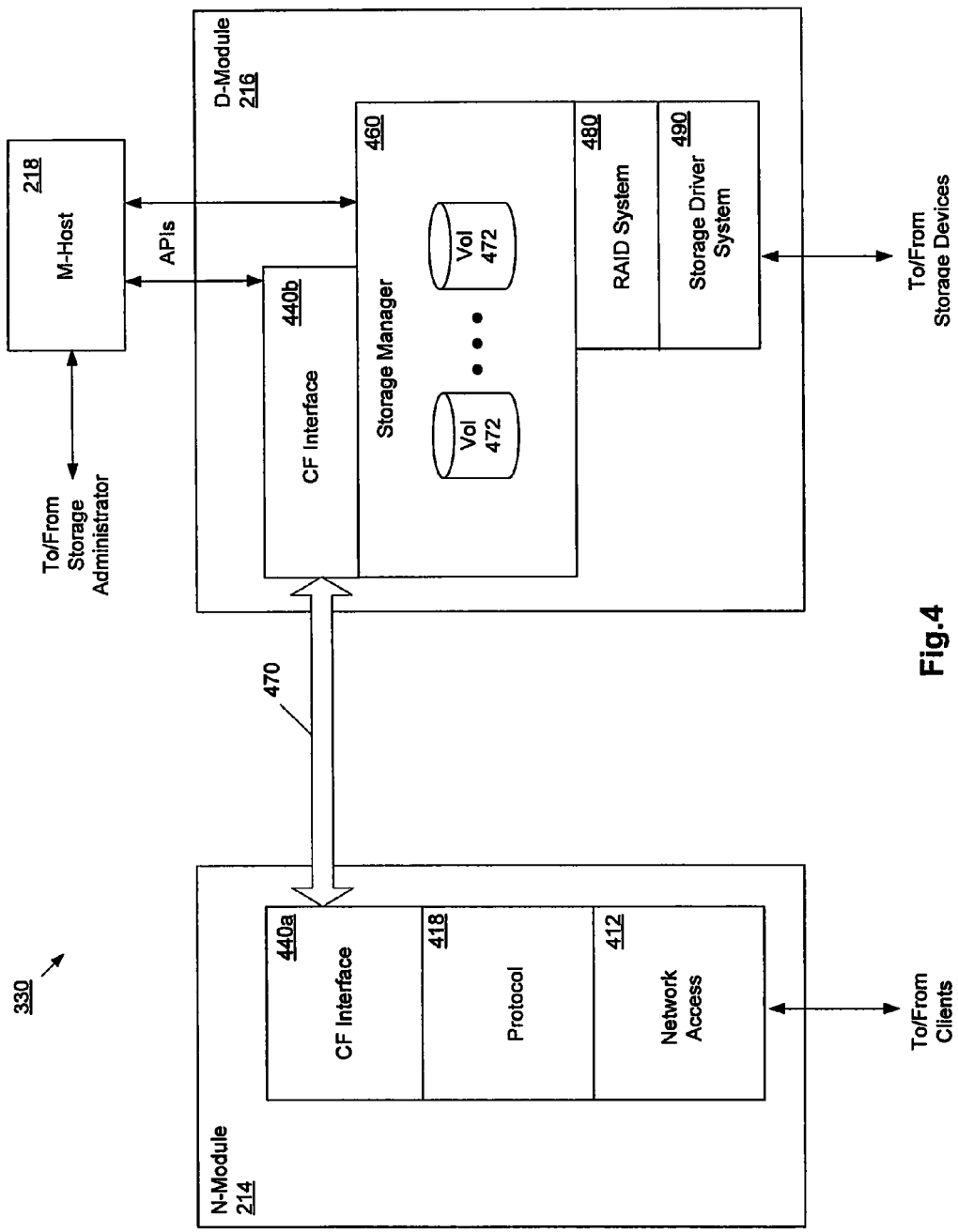
FIG. 4 illustrates an example of a storage operating system of a storage server node in a clustered network storage system.

FIG. 4 illustrates an example of the storage operating system 330, which can be used in a clustered environment such as shown in FIG. 2. In the illustrated embodiment the storage operating system 330 implements the N-module 214, D-module 216 and M-host 218, as described above. The modules may be implemented on the same or separate storage systems or computers. The N-module 214 includes multiple functional layers organized to form an integrated network protocol stack. The network protocol stack provides data paths for clients to access information stored on the node using block and file access protocols. The network protocol stack in combination with underlying processing hardware forms the N-module 214.

The network protocol stack in the N-module 214 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The network protocol stack also includes a multi-protocol layer 418 which implements various higher-level network protocols, such as Network File System (NFS), Common Internet File System (CIFS), Hypertext Transfer Protocol (HTTP), Internet small computer system interface (iSCSI), etc. Further, the network protocol stack includes a cluster fabric (CF) interface module 440a which implements intra-cluster communication with D-modules and with other N-modules.

In addition, the storage operating system 330 includes a set of data access layers organized to provide data paths for accessing information stored on the disks 212 of the node 208; these layers in combination with underlying processing hardware forms the D-module 216. To that end, the data access layers include a storage manager module 460 that manages any number of volumes 472, a RAID system module 480 and a storage driver system module 490.

The storage manager 460 primarily manages a file system (or multiple file systems) and serves client-initiated read and write requests. The RAID system 480 manages the storage and retrieval of information to and from the volumes/disks in accordance with a RAID redundancy protocol, such as RAID-4, RAID-5, or RAID-DP, while the disk driver system 490 implements a disk access protocol such as SCSI protocol or FCP.

The data access layers also include a CF interface module 440b to implement intra-cluster communication link 470 with N-modules and/or other D-modules. The nodes 208 in the cluster 202 can cooperate, through their respective CF interface modules 440a and 440b, to provide a single file system image across all D-modules 216 in the cluster 202. Stated another way, the various D-modules 216 can implement multiple distinct file systems within a single global namespace. A "namespace" in this context is a set of names that map to named objects (e.g., files, directories, logical units). "Global" means that each name is independent of the physical location of the corresponding object. A global namespace therefore applies at least across an entire cluster, and potentially can be extended to apply to multiple clusters. Thus, any N-module 214 that receives a client request can access any data container within the single file system image located on any D-module 216 of the cluster, and the location of that data container can remain transparent to the client and user.

The CF interface modules 440 implement the CF protocol to communicate file system commands among the modules of cluster 202 over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 is forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 generates operations to load (retrieve) the requested data from disk 212 if it is not resident in memory 320. If the information is not in memory 320, the storage manager 460 indexes into a metadata file to access an appropriate entry and retrieve a logical VBN. The storage manager 460 then passes a message structure including the logical VBN to the RAID system 480; the logical VBN is mapped to a disk identifier and disk block number (DBN) and sent to an appropriate driver (e.g., SCSI) of the disk driver system 490. The disk driver accesses the DBN from the specified disk 212 and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented at least partially in specially designed hardware. That is, in an alternate embodiment of the invention, some or all of the storage operating system 330 is implemented as logic circuitry embodied within a field programmable gate array (FPGA) or an application specific integrated circuit (ASIC), for example.

The N-module 214 and D-module 216 can be implemented as processing hardware configured by separately-scheduled processes of storage operating system 330. In an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

The operating system 330 also includes M-host 218, which provides management functions for the cluster 202, including user interface functionality to enable an administrator to manage and control the cluster 202 (e.g., through management station 207). Because each node 208 in the cluster 202 has an M-host 218, the cluster 202 can be managed via the M-host 218 in any node 208 in the cluster 202. The functionality of an M-host 218 includes generating a user interface, such as a graphical user interface (GUI) and/or a command line interface (CLI), for a storage network administrator. The functionality of an M-host 218 can also include facilitating the provisioning of storage, creating and destroying volumes, installation of new software, controlling access privileges, scheduling and configuring data backups, scheduling data mirroring function, and other functions. The M-host 218 communicates with its local D-module 214 or with any remote D-module by using a set of APIs. The M-host 218 includes network interfaces (not shown) to communicate with D-modules and to communicate with one or more external computers or input/output terminals used by network administrators.

Storage Efficiency Operations in a Clustered Network Storage System

Figure 5:
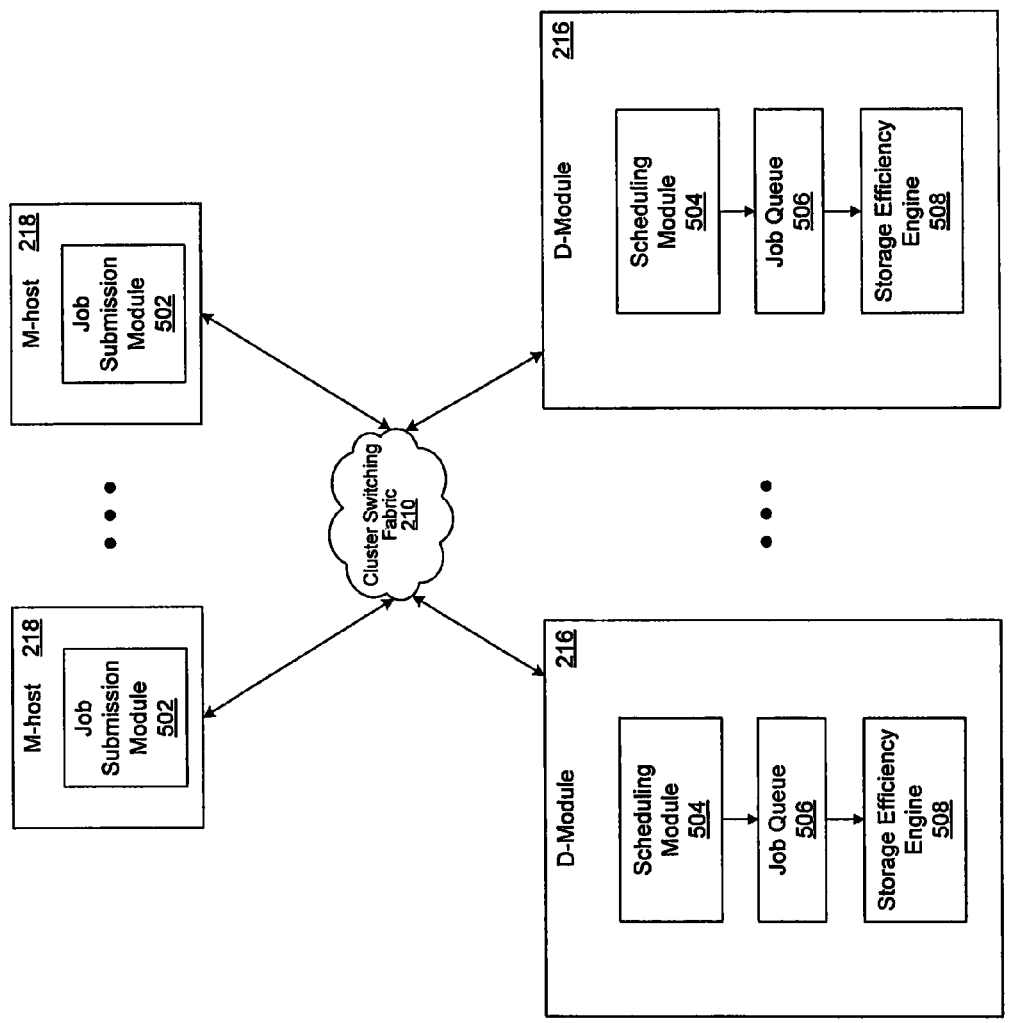
FIG. 5 illustrates an example of a resource allocation mechanism on a clustered network storage system.

FIG. 5 shows an example of a resource allocation mechanism in a clustered network storage system according to the techniques described herein. The clustered network storage system in FIG. 5 is abbreviated to show only a plurality of M-hosts 218 and a plurality of D-modules 216 connected through a cluster switching fabric 210. However, other components necessary for proper functioning of the cluster, but which are not germane to this description (e.g., N-modules) are assumed to be present.

As described above with reference to a non-clustered network storage system, each D-module 216 of the clustered network storage system of FIG. 5 includes a storage efficiency engine 508. Each storage efficiency engine 508 can perform, for example, deduplication and/or compression operations to more efficiently use storage space on the storage devices (not shown) managed by D-module 216. The goal of deduplication is to ensure that there is no more than one instance of a particular data segment stored on a volume, thereby reducing the used storage space. This task is significantly more difficult in a clustered network storage system as data contained on a volume may be spread over multiple storage devices controlled by multiple D-modules. A D-module also has limited processing resources for storage efficiency operations, so there is a limit on the number of storage efficiency operations that can be carried out simultaneously. These limited resources and the potentially large number of requests that can be made of the D-module in a clustered network storage system give rise to resource over-commitment. As used herein, the term "resource over-commitment" refers to a processor, memory or other component in a node being tasked with more operations than it has the ability to carry out at an acceptable or desired minimum level of performance or efficiency.

The resource allocation mechanism according to the example of FIG. 5 further includes a job submission module 502 in at least one M-host 218, and a scheduling module 504, and a job queue 506 in each D-module 216. The job submission module 502 provides a mechanism for controlling when jobs (e.g., storage efficiency jobs) can be submitted to a D-module 216 for processing. In one embodiment the job submission module 502 is managed according to a credit based scheme. Initially, credits may be allocated to the job submission module 502 based on a variety of factors, for example, the projected usage of node resources. When each D-Module 216 registers on the network it registers with the M-host 218 the availability of storage efficiency job slots. The M-host 218 converts these job slots to the credits allocated to the D-Module 216. The M-host 218 maintains a record of how many credits a particular D-module has available. The job submission module 502 can send a job request to the storage efficiency engine 508 in any node if the corresponding D-module has a credit available. If no credit is available for a particular storage efficiency engine, the job submission module 502 can wait for a credit to become available before submitting a job request to that engine.

When a storage efficiency operation is requested, either by a network administrator or some predetermined event, and a credit is available, the job submission module 502 sends a job request through the cluster switching fabric 210 to the D-module 216 where the operation is to be performed. The scheduling module 504 which is implemented on that D-module receives the job request and schedules a job according to a prioritization scheme.

A job is scheduled in response to receiving a job request at the scheduling module 504. A job entry is placed in the job queue 506 for the requested job according to the prioritization scheme. If the storage efficiency engine 508 has processing resources available to process the job, the job is immediately processed. If the storage efficiency engine does not have the processing resources available to immediately process the job, i.e. the maximum number of jobs is already being processed, the job entry waits in the job queue 506 until capacity becomes available. The fact that a job entry has been placed in the job queue 506 will be transparent to the client. A "success" status indication will be returned to the client when the job entry is placed in the job queue 506.

Prioritization of jobs in the job queue 506 happens, for example, when two or more clients who own volumes on a given D-module request a storage efficiency job at a time when the storage efficiency engine is running at full capacity. In that event, the job scheduling module will place the higher priority job at the top of the queue for it to be processed first. Priority can be determined by the cluster administrator. Several factors can be considered when determining priority of clients for scheduling purposes. For example, the amount of storage space a requesting client has on the D-module, the quality of service promised to the client, and the type of job request. Other factors affecting priority of clients can also be considered.

The scheduling module 504 can issue a special request for a job to be processed. Through a special request, the requested job can be sent directly to the storage efficiency engine and bypass the job queue 506. This may happen, for example, when a high priority client requests a job to be performed, or when a high priority job type is requested. The special request only changes the way jobs are performed when the storage efficiency engine is running at full capacity. If the storage efficiency engine is not running at full capacity, all jobs are sent directly to the storage efficiency engine for processing and no jobs are placed in the queue. However, when the special request is made, and the storage efficiency engine is running at full capacity, it is up to the scheduling module to determine which currently running job is pre-empted to make room for the special request. If there is no job that can be pre-empted, the job request will fail and an error be returned to the requestor.

For example, assume that two clients, client A and client B, both own volumes with storage on a given D-module 216. Assume further that client A has a higher priority than client B based on some predetermined factor, e.g., client A has more storage capacity than client B. Each client is managed from a separate instance of M-host 218 (e.g. client A is managed from M-host instance A and client B is managed from M-host instance B). Client B submits a job request through the job submission module 502 of M-host B 218 but the storage efficiency engine 508 is running at full capacity, so a job entry is placed into the job queue 506 by the scheduling module 504 on the target D-module 216. Client A then requests a job for processing through the job submission module 502 of M-host A 218, before the job requested by client B is processed. The scheduling module 504 on the target D-module 216 places a job entry for client A in the job queue 506 so that it will be processed prior to the job for client B. If two clients have the same priority a job entry for each client will be placed in the queue in the order in which they are received.

Further, if the job requested by client A was a special request, the scheduling module could determine if a job currently running on the storage efficiency engine could be pre-empted. If a job could be pre-empted, then the requested job could begin processing immediately. If not, an error would be returned to the requestor of the special request.

Figure 6:
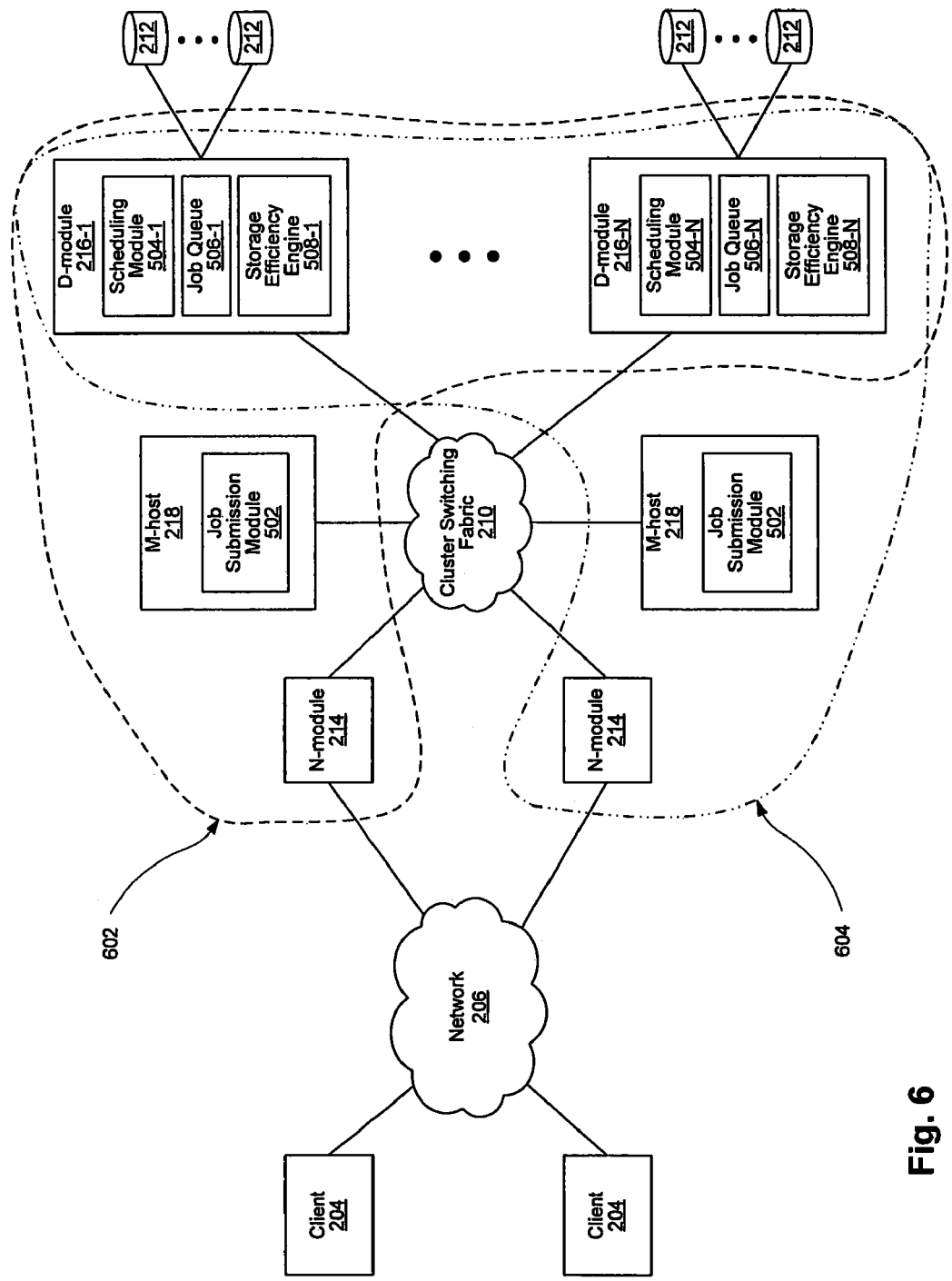
FIG. 6 illustrates an example of a clustered network storage system including a plurality of virtual servers and a resource allocation mechanism.

FIG. 6 illustrates an example of a clustered network storage system including a plurality of virtual servers and a resource allocation mechanism according to the techniques described herein. Virtual servers allow the sharing of the underlying physical server resources, e.g. the processor and memory, between virtual servers while allowing each virtual server to run its own operating system. Multiple server operating systems that used to run on individual machines, in order to avoid interference, are now able to run on the same physical machine because of a level of isolation provided by a virtual server. This is a more cost effective means for providing storage server solutions to multiple clients than providing separate physical server resources for each client.

The system of FIG. 6 includes a plurality of client systems 204, a plurality of virtual servers 602 and 604 implemented in a clustered network storage system, and a computer network 206 connecting the client systems 204 and the clustered network storage system. As shown in FIG. 6 each virtual server includes an N-module 214, an M-host 218, and a plurality of D-modules 216 which communicate through the cluster switching fabric 210. Each virtual server shown in this figure is associated with a separate M-host 218 but owns volumes on the plurality of common D-modules 216. The virtual server configuration shown in FIG. 6 can give rise to resource over-commitment as described above with respect to FIG. 5 because the level of isolation between the virtual servers that is broken when multiple virtual servers request storage efficiency jobs to be processed by a single D-module 216-1 in the cluster. The resource allocation mechanism (e.g., the job submission module 502, the scheduling module 504, the job queue 506, and the storage efficiency engine 508) in the example of FIG. 6 operates in substantially the same manner as described with respect to FIG. 5.

Figure 7:
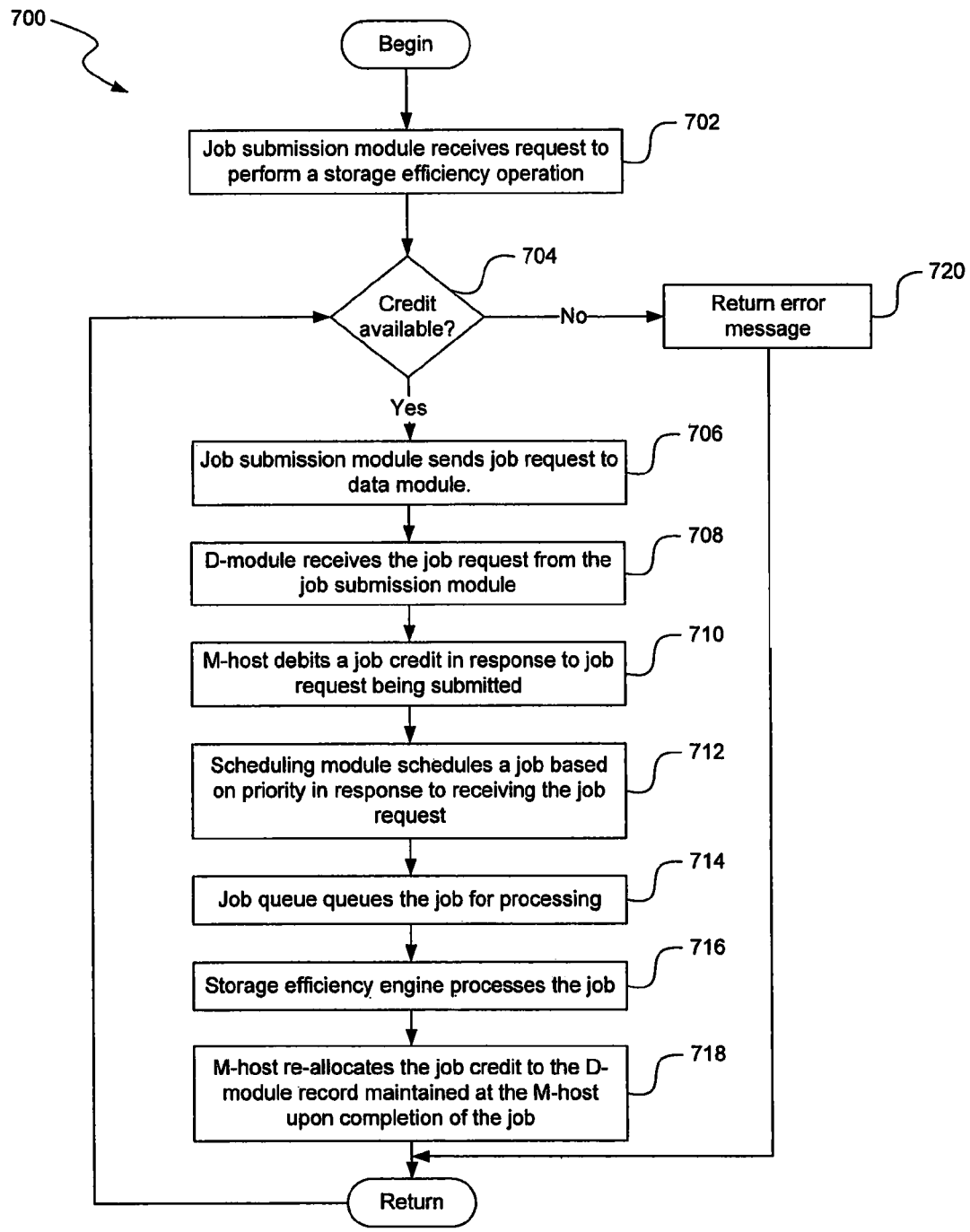
FIG. 7 is a flow diagram of a process for preventing resource over-commitment on a node of a clustered network storage system.

FIG. 7 is a flow diagram of a process of preventing resource over-commitment on a node of a clustered network storage system according to the technique introduced here. The process is organized as a sequence of operations in the flowchart 700. However, it should be understood that at least some of the operations associated with this process can potentially be reordered, supplemented, or substituted for while still performing the same overall technique.

Initially, at 702 the job submission module 502 of the node receives a request to perform a storage efficiency operation. The request can come from a network administrator or can be triggered by some predetermined event. At 704 the job submission module 502 checks to determine if a job credit is available. If a job credit is not available (704—No), an error message is returned and the process ends. If a job credit is available (704—Yes), the job submission module 502 sends a job request to the D-module 216 where the job is to be performed at 706. The job request can be sent through the cluster switching fabric 210.

At 708 the D-module 216 receives the job request from the job submission module 502. Once the job is submitted, at 710 the M-host 218 debits a credit from the D-Module record maintained by the M-host, hence reducing the capability of the D-Module 216 to accept more jobs. For each D-Module 216, a resource object is created in the M-host 218 for each function that consumes resources on the D-Module. This object can be stored in a replicated database that is available to all instances of the M-host in the cluster. This object will keep track of the D-Blade resource in distributable credits. When a cluster administrator, or other local administrator or process, requests a job which requires D-Module resources, the M-host reduces the number of credits in the resource object available for distribution.

Once a resource has been allocated, and a credit is removed from the resource object, the job requested is guaranteed. If the resource object has no more credits available, all other requests are best effort, meaning requests that are not guaranteed will be processed if there are resources available, and will have to yield to guaranteed requests. The resource object can be controlled by role based access control (RBAC) and cluster wide allocation policies. Since the administrator is dealing with credits, perhaps spanning multiple D-Modules, the administrator is spared the details of D-Module resource limitations.

At 712 the scheduling module 504 schedules a job based on the prioritization scheme in response to receiving the job request. At 714 the job queue 506 queues the job for processing, i.e., places a job entry for the requested job in the job queue 506. If the storage efficiency engine 508 is not processing at full capacity when a job is placed in the job queue 506, the job is immediately processed. However, if the storage efficiency engine 508 is processing the maximum number of jobs at the time the job is placed in the job queue 506, the job waits for processing and a "success" indication is sent to the user.

At 716 the storage efficiency engine 508 processes the job and removes or invalidates the corresponding job entry in the job queue 506. The storage efficiency engine 508 processes jobs stored in the job queue 506 when the storage efficiency engine has processing capacity available. At 718 the M-host 218 re-allocates the job credit to D-module record maintained by the M-host upon completion of the job. Once a job is completed by the D-Module 216, it signals the M-host 218 that a job is complete. Consequently, the M-host 218 adds a credit to the D-module record maintained at the M-host 218, and the process ends.

The techniques introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method performed in a clustered network storage system including a plurality of storage server nodes, the method comprising:
    maintaining, by a management module in each of the plurality of storage server nodes, a record of job credits corresponding to available resources of the clustered network storage system, wherein each of the storage server nodes includes one of a plurality of management modules and one of a plurality of data modules;
    receiving, at one of the data modules, a job request from a job submission module implemented in one of the management modules;
    debiting, in said one of the management modules, a job credit from a record of job credits corresponding to said one of the data modules, in response to receiving the job request;
    scheduling, in said one of the data modules, a job for execution on said one of the data modules, based on a priority, in response to receiving the job request;
    queuing the job in said one of the data modules, for processing;
    executing the job on said one of the data modules; and
    re-allocating, in said one of the management modules, the job credit to the record of job credits upon completion of the job.

2. The method of claim 1 wherein the job is a data deduplication job.

3. The method of claim 1 wherein the job is a data compression job.

4. A clustered network storage system comprising:
    a plurality of storage server nodes, each including:
    a processor;
    a management module, operatively coupled to the processor, which includes a job submission module to submit a job request;
    a data module coupled to communicate with the management module through an interconnect, the data module including a job scheduling module to receive the job request submitted from the job submission module and to schedule a job according to a prioritization, and a job queue to queue the job for processing according to the prioritization;
    a network module coupled to communicate with the management module and the data module through the interconnect, the network module to allow a client to access the clustered network storage system; and
    a resource object implemented in the management module, wherein the resource object maintains a record of the resources available to process jobs on the data module in the form of job credits, and wherein the job request is submitted by the job submission module based on a job credit being available in the resource object, and wherein the management module is configured to debit the job credit from said record in response to submission of the job request and to re-allocate the job credit to said record upon completion of the job.

5. The system of claim 4 wherein the job submission module is permitted to submit the job request only when a job credit is available.

6. The system of claim 4 further comprising a virtual server which includes the management module.

7. The system of claim 6 wherein the virtual server accesses resources from two or more of the plurality of storage server nodes in the clustered network storage system.

* * * * *